United States Patent [19]

Ogura et al.

[11] Patent Number: 4,791,493

[45] Date of Patent: Dec. 13, 1988

[54] IMAGE READING APPARATUS WITH ILLUMINATION TIMING CONTROL

[75] Inventors: Makoto Ogura, Hiratsuka; Tatsundo Kawai, Kawasaki; Katsuhiko Yamada, Hiratsuka; Shinichi Seitoh, Isehara, all of Japan

[73] Assignee: Canon Kabushiki Kaisha, Tokyo, Japan

[21] Appl. No.: 88,486

[22] Filed: Aug. 19, 1987

Related U.S. Application Data

[63] Continuation of Ser. No. 757,471, Jul. 22, 1985, abandoned.

[30] Foreign Application Priority Data

Jul. 31, 1984 [JP] Japan ................................ 59-160340

[51] Int. Cl.⁴ .......................................... H04M 1/024
[52] U.S. Cl. .................................... 358/294; 250/57 B
[58] Field of Search ............ 358/256, 293, 294, 213.1; 250/57 C

[56] References Cited

FOREIGN PATENT DOCUMENTS 4114667 7/1983 Japan ................................. 358/294

Primary Examiner—Edward L. Coles, Sr.
Attorney, Agent, or Firm—Fitzpatrick, Cella, Harper & Scinto

[57] ABSTRACT

An image reading apparatus for reading an image by radiating the light onto an original includes a photosensor array the photosensors of which are arranged along the width of the original and receive the light scattered from the original surface and convert that light into electric signals. A period of time from the time when the photosensors receive the light until outputs containing the read information are derived cannot be ignored as compared with a reading scan time when the signals are read from the photosensor. A light source is arranged along the width of the original and is divided into a plurality of. A light-on controller for lighting the blocks of the light source to illuminate pixels for the reading of an image on the original, in advance of the reading of the pixels, for a time interval over neater than the foregoing period of time. In this apparatus, only a single LED array is used, so that the arrangement of the apparatus is simplified and the cost of the apparatus and its operating cost are also reduced.

5 Claims, 7 Drawing Sheets

IMAGE READING APPARATUS WITH ILLUMINATION TIMING CONTROL

This application is a continuation of application Ser. No. 757,471 filed July 22, 1985 now abandoned.

BACKGROUND OF THE INVENTION

1. Field of the Invention

The present invention relates to an image reading apparatus which reads an image by radiating the light onto an original and, more particularly, to improvements in an arrangement of a light source to illuminate the original and in a driving apparatus of the light source.

2. Description of the Prior Art

Recently, in image reading apparatuses such as optical input means for a facsimile apparatus, a copying machine or the like, demand for miniaturization has been increasing. To satisfy such demand, in many cases, an LED array in which a plurality of LED chips are arranged is used for illumination of the original surface in place of a fluorescent lamp, which has been used conventionally.

Figure 1:
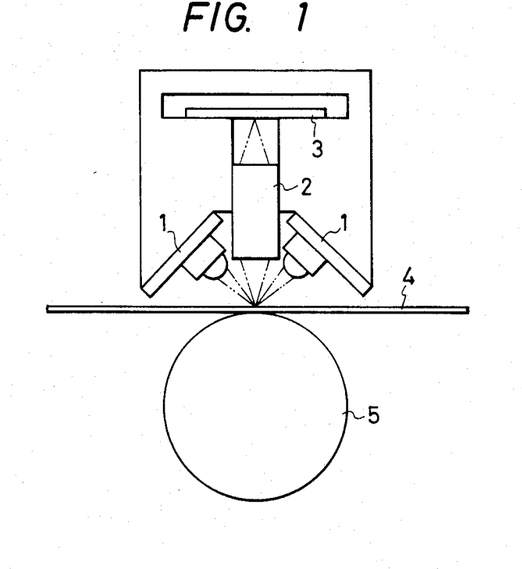
FIG. 1 is a cross sectional view showing an example of a conventional image reading apparatus.

FIG. 1 shows an example of such a conventional image reading apparatus. In the diagram, a reference numeral 1 denotes an LED array serving as an illumination light source; 2 is a lens array of the refractive index distribution type serving as an optical system; 3 is a photo sensor array; 4 is an original; and 5 is a roller for conveying the original. The original 4 is illuminated by two LED arrays 1 which are arranged upstream and downstream in the original conveying direction of the lens array 2. The light reflected by the original surface is formed as an image on the photo sensor array 3 by the lens array 2 and an image on the original is read. Hitherto, in such an image reading apparatus using the LED arrays for illumination of the original surface as mentioned above, two LED arrays have had to be used to derive a sufficient quantity of light to read. However, the use of two LED arrays obviously results in an increase of the cost of the whole apparatus.

On the other hand, if only a single LED array is provided and a great amount of current is allowed to flow throught the LED chip to produce a sufficient amount of light, the temperature of the LED array will be increased and this will contrarily cause a decrease in the light amount output due to deterioration of the LED chip.

For example, in Japanese Patent Unexamined Publications Nos. 114665/1983 to 114667/1983, to eliminate such a drawback, there has been proposed an apparatus in which an LED array is divided into a plurality of blocks and these blocks are allowed to sequentially flicker in correspondence to the reading scan of the photo sensor array. By driving the LED array in this way, a sufficient light quantity to read an image can be obtained using only a single LED array, and at the same time an increase in temperature of the LED array is averted and a deterioration of the LED can be prevented.

However, in such a conventional apparatus, the LED array is driven in consideration only of the case where the light response leading time $\tau_{on}$ of the photo sensor is so short that it can be ignored as compared with the time S of a single reading scan of the photo sensor array. Therefore, this apparatus cannot be applied to the case where a photo sensor in which the foregoing leading time $\tau_{on}$ is not negligible as compared with the scan time S (for instance, $\tau_{on} \geq S/10$) is used or where a photo sensor of the signal accumulation type is used. Particularly, even in the case of the non-signal-accumulation type photo sensor, the ratio of the leading time $\tau_{on}$ to the scan time S becomes high in association with high-speed image reading; thus, a problem is caused in the conventional LED array driving process.

SUMMARY OF THE INVENTION

The present invention is made in consideration of the drawbacks in such conventional examples and it is an object of the invention to provide the optimum block dividing method and driving method for an LED array serving as an original illumination light source to an image reading apparatus using a photosensor having the light response leading time $\tau_{on}$ which is so long that it cannot be ignored as compared with the reading scan time S or a photosensor of the signal accumulation type, thereby making it possible to use only a single LED array in place of a conventional type in which two LED arrays have to be used and thereby to reduce the cost of such an image reading apparatus and to decrease the operating cost.

This object of the invention is achieved by providing an image reading apparatus comprising: a photosensor array of photosensors which are arranged in the direction of width of an original and which receive the light scattered by the original surface and convert the information borne thereby into electric signals, in which the period of time from the time when the photosensor receive the light until the outputs regarding the reading are derived cannot be ignored as compared with the reading scan time when signals are read from the photosensor array; a light source having a plurality of blocks arranged in the direction of width of the original; and light-on control means for lighting the blocks of the light source for reading an image on the original, prior to the reading, for a time interval greater than the foregoing period of time.

DETAILED DESCRIPTION OF THE PREFERRED EMBODIMENT

The present invention will now be decribed in detail hereinbelow with reference to the drawings.

Figure 2:
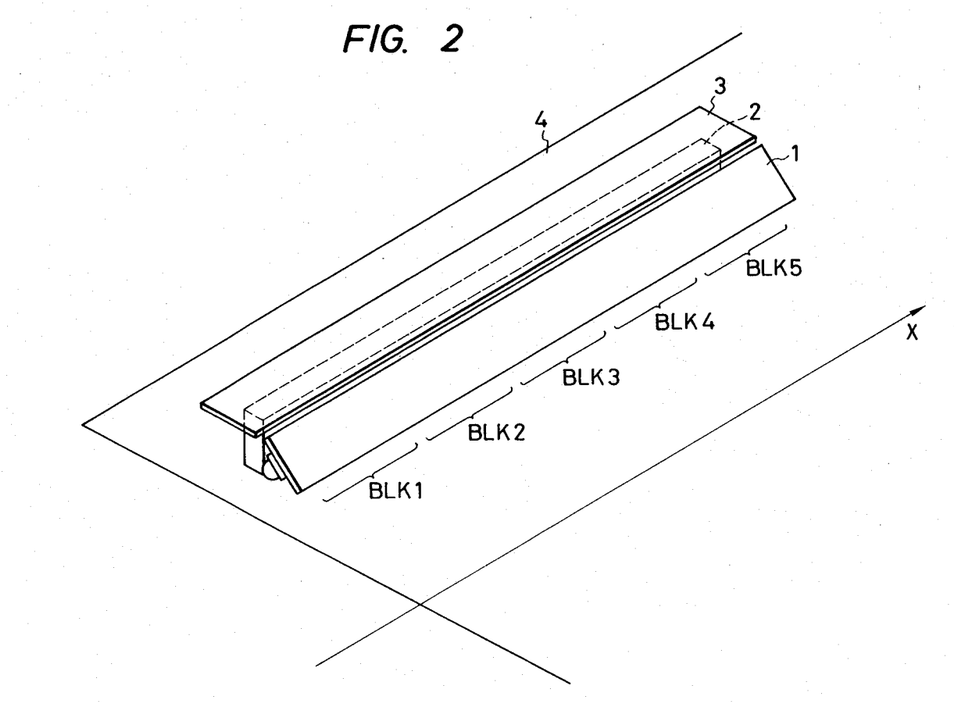
FIGS. 2 and 3 are a perspective view and a cross sectional view showing an example of an arrangement of an image reading apparatus according to the present invention.
Figure 3:
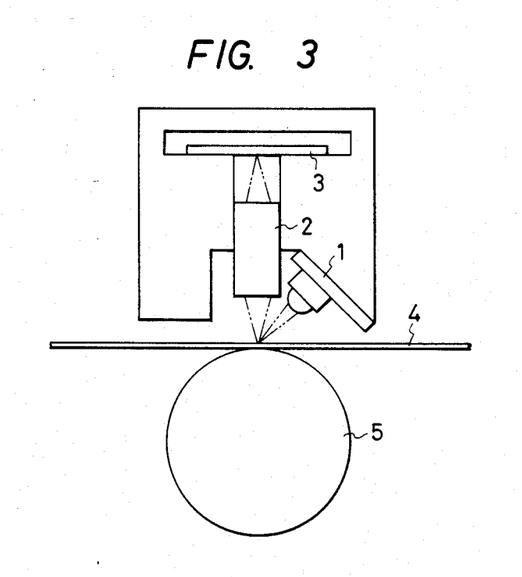

FIGS. 2 and 3 show an example of an arrangement of an image reading apparatus of the present invention, in which parts and components which can be constituted in a similar manner as those in the conventional example shown in FIG. 1 are designated by the same reference numerals and their descriptions are omitted. In the embodiment of FIG. 3, it is assumed that the LED array 1 which is divided into five blocks $BLK_1$ to $BLK_5$ by wiring patterns printed on a board is used.

Figure 4:
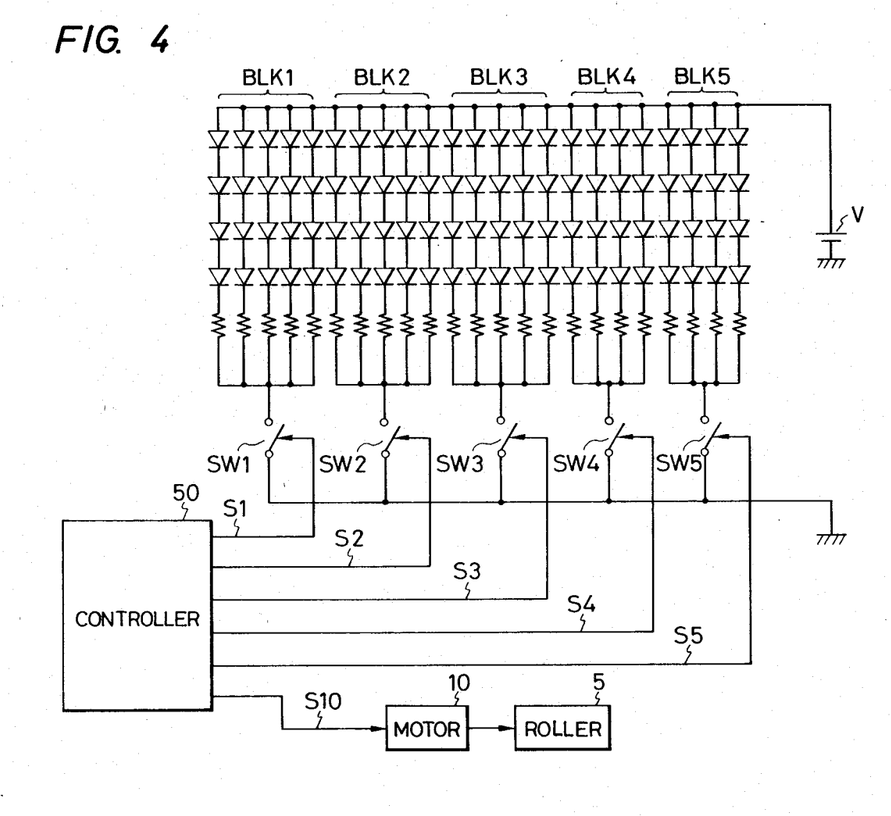
FIG. 4 is a circuit diagram showing an example of an LED array and a driving circuit for this LED array according to an embodiment of the invention.

FIG. 4 shows an example of an arrangement of an internal circuit of the LED array 1 and a control circuit to control the drive timing of this internal circuit according to the embodiment. In FIG. 4, a reference character V denotes a driving power source for the blocks $BLK_1$ to $BLK_5$ of the LED array 1, and $SW_1$ to $SW_5$ are switches to make the blocks $BLK_1$ to $BLK_5$ flicker. A numeral 50 is a controller to control each section. This controller generates signals $S_1$ to $S_5$ for switching the switches $SW_1$ to $SW_5$ on and off and thereby controlling the flickering operations of the blocks $BLK_1$ to $BLK_5$ and a control signal $S_{10}$ for a paper feed motor 10 to drive the paper feed roller 5.

Figure 5:
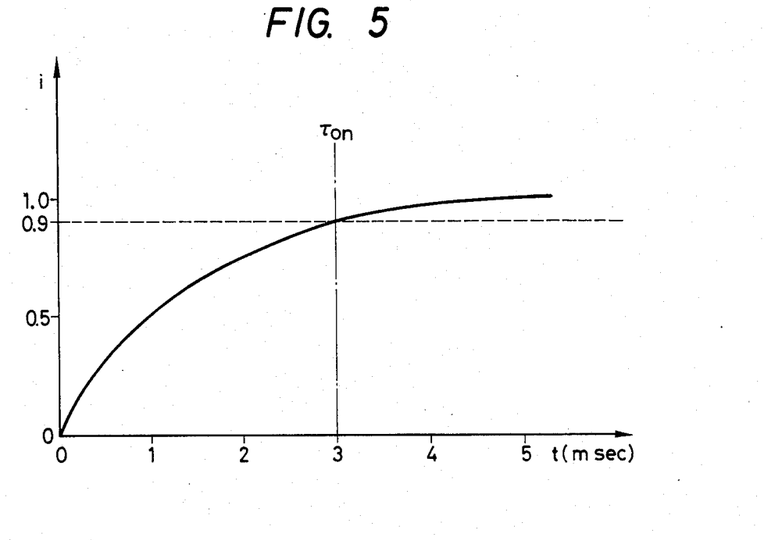
FIG. 5 is a characteristic curve diagram showing the light response leading characteristic of a photo sensor used in the embodiment.

FIG. 5 is a graph showing the leading characteristic of the photosensor 3 which is used in this embodiment. This graph shows a change of a current i flowing through the photosensor 3 from the time point when the illumination of the light flux of a predetermined light quantity onto the photosensor 3 to which a predetermined voltage has been applied is started. In this graph, the ordinate axis indicates the current i and the abscissa axis represents the time t (msec). When the saturated current value is 1, the period of time from the start of illumination (t=0) until the current value reaches 0.9 is set to the light response leading time $\tau_{on}$. The leading time $\tau_{on}$ of the photosensor 3 used in this embodiment is 3 msec.

Figure 6A:
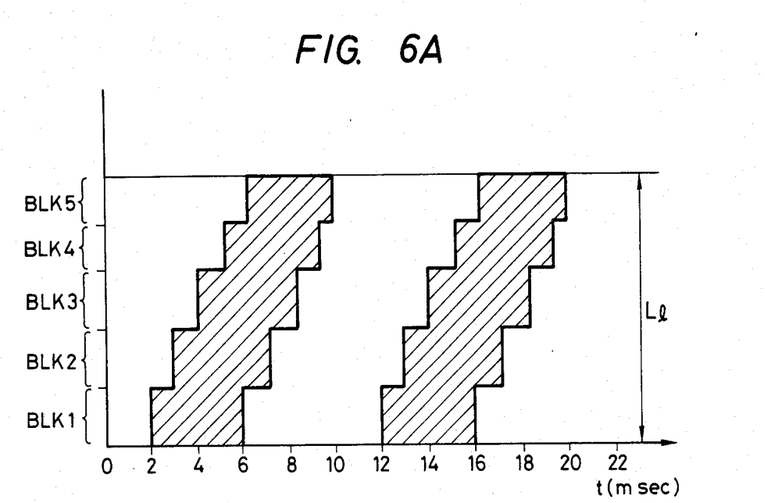
FIGS. 6A and 6B are explanatory diagrams showing timings to drive the LED array and photo sensor array according to the embodiment, respectively.
Figure 6B:
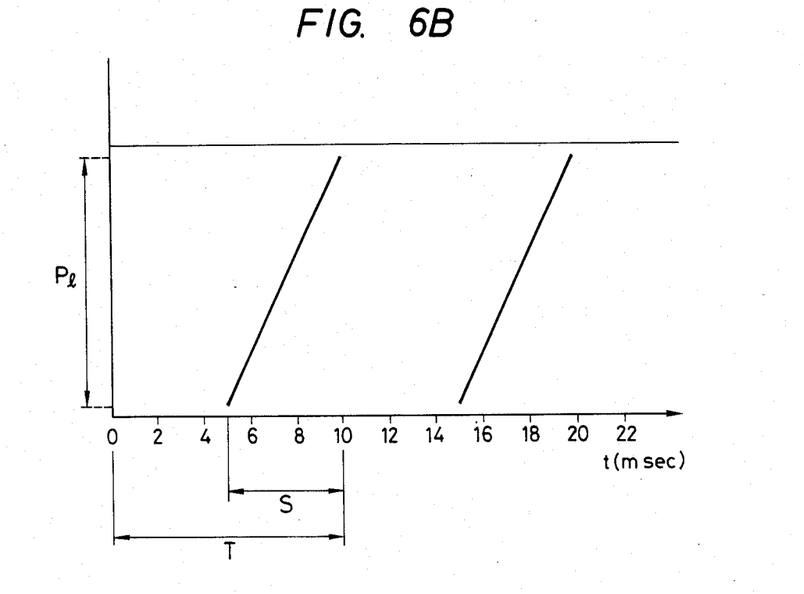

FIGS. 6A and 6B show timings to drive the LED array 1 and photo sensor array 3 in the embodiment, respectively. In FIG. 6A, the ordinate axis indicates the x coordinate in the effective length Ll of the LED array along the X axis (in the direction of width of the original) in FIG. 3 and the abscissa axis shows the time t, and the hatched portions represent that the blocks in the LED array 1 are lighting. In FIG. 6B, the ordinate axis shows the x coordinate of the position in the effective length Pl of the photo sensor array along the X axis in FIG. 3 and the abscissa axis indicates the time t, and the oblique lines denote that a signal is being read from the photosensor at the position at that time. In this embodiment, the original 4 is fed during the time intervals of t=0 to 5 msec and t=10 to 15 msec.

Since the light response leading time $\tau_{on}$ of the photo sensor 3 is 3 msec in the embodiment, the block of the LED array 1 used for the image formation for arbitrary bits on the photosensor 3 must be lighted over 3 msec before reading of the signal of the photosensor 3. FIG. 6A shows an example whereby the timing for flickering was selected in such a manner that the duty ratio of the driving time of the LED array 1 becomes a minimum when the number n of divided blocks of the LED array 1 is chosen to equal 5 in consideration of the foregoing point. In this case, the duty ratio is 40%.

Figure 7:
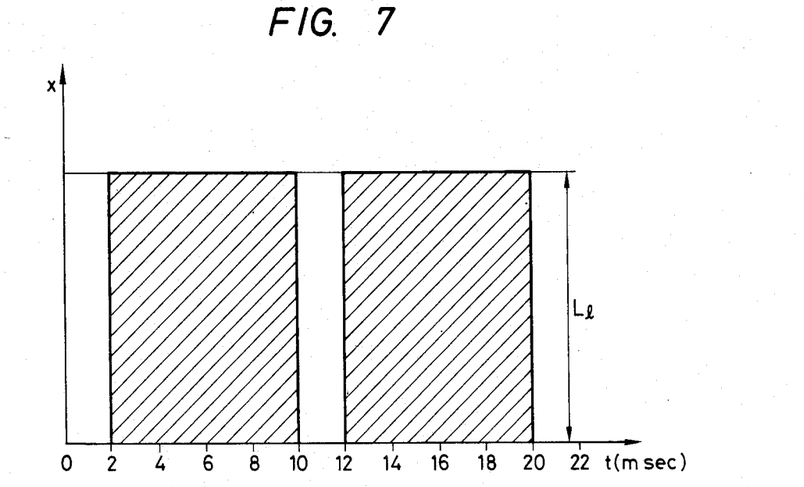
FIG. 7 is an explanatory diagram showing a drive timing in the case where the LED array is not divided into blocks for comparison with the embodiment.

For comparison with the case of FIG. 6A, FIG. 7 shows the drive timing in the case where the LED array 1 is not divided into blocks and in this case the lowest duty ratio is 80%. Namely, according to the drive timing for the LED array 1 in FIG. 6A, the duty ratio is reduced by half as compared with the case according to the drive timing in FIG. 7.

In case of using the photosensor which is controlled by the present invention namely, the photosensor having the light response leading time $\tau_{on}$ which is so long that it cannot be ignored as compared with the reading operation time S, the lowest duty in driving of the LED array is expressed by $$\text{duty} = (\tau_{on} + S/n)/T \tag{1}$$

where, T is a time of one period of the reading scan including the paper feed time or the like as well. On the other hand, as in a conventional apparatus, in case of using the photo sensor whose leading time is $\tau_{on}$ is so short that it can be ignored, the lowest duty is expressed by $$\text{duty} = S/(n \cdot T) \tag{2}$$

in other words, a remarkable difference between the apparatus according to the invention and the conventional apparatus is that the lowest duty simply decreases in inverse proportion to the number n of divided blocks in the conventional case, while in the case of the present invention, the lowest duty has a constant bias component $\tau_{on}/T$ in addition to the term which is inversely proportional to n.

Figure 8:
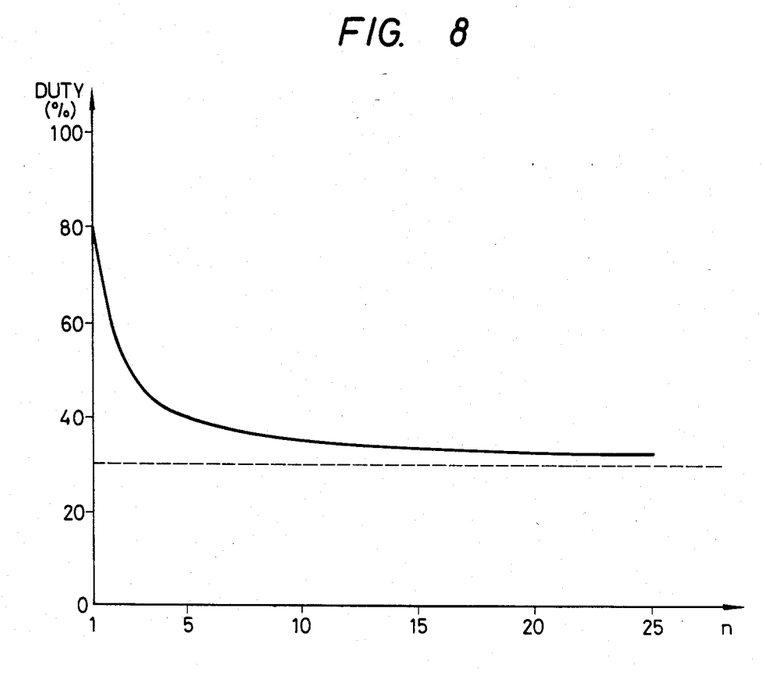
FIG. 8 is an explanatory diagram showing the correlation between the number of divided blocks of the LED array and the lowest duty in case of using the photo sensor array according to the embodiment.

FIG. 8 shows the correlation between the number n of divided blocks of the LED array and the lowest duty in the case of using the photo sensor according to this embodiment.

It will be appreciated from this graph that in the case where the leading time $\tau_{on}$ cannot be ignored, even if the number n of divided blocks is uselessly increased, the resulting reduction of the duty ratio is small. On the contrary, the circuit arrangement to make blocks flicker at different timings becomes complicated and this results in a cause of increase in cost of the apparatus.

The present invention, accordingly, intends to propose $$n < 10 \times S/\tau_{on} \tag{3}$$

as a region where the effect of reduction of the duty overcomes a disadvantage which is cause due to a complication of the circuit arrangement. When $n = 10 \times S/\tau_{on}$, the lowest duty is 1.1 times the lowest duty in the case where $n \to \infty$ and even if the number n is increase more than that value, the reduction of the duty is little. In this embodiment, the limitation of $n = 10 \times S/\tau_{on}$ is given when n=17.

There will be explained the driving process of the LED array 1 in the case where the number n of divided blocks is 5 (<17) which was adopted in this embodiment. This process can be executed in a manner such that, for instance, a timer is made operative when the driving signal $S_{10}$ for the motor 10 is turned on at the start of this process, and thereafter the signal $S_{10}$ is turned off and the signals $S_1$ to $S_5$ are turned on or off at the drive timings for the blocks $BLK_1$ to $BLK_5$ that are determined on the basis of the turn-off time of the motor 10 (5 msec after the start of the motor) and of the timing chart in FIG. 6B and the leading time $\tau_{on}$.

Figure 9:
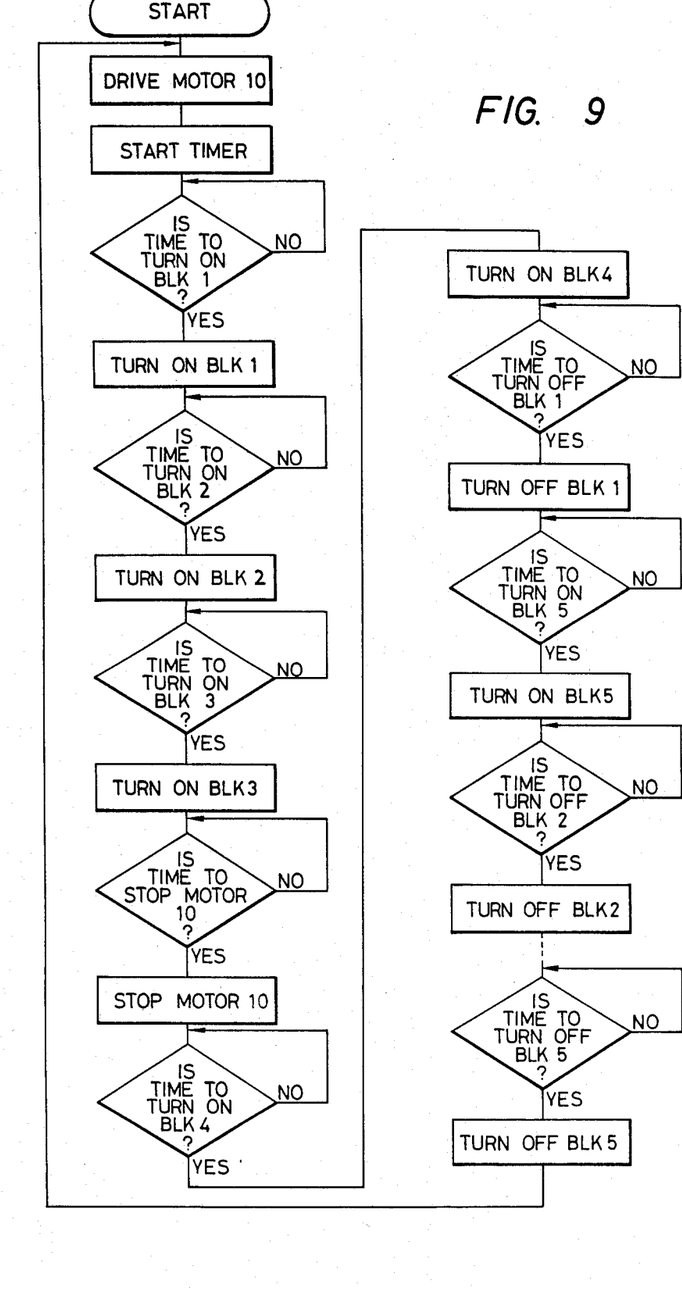
FIG. 9 is a flowchart showing an example of a drive processing procedure of the LED array according to the embodiment.

Such a process can be also realized using a microcomputer in the controller 50 is accordance with such a processing procedure as shown in, for instance, FIG. 9, or may be also realized by way of a hardware by constituting a proper logic circuit. In any of these cases, by deciding a suitable division number, the driving process for the LED array 1 can be extremely simply performed with a high efficiency.

As described above, according to the present invention, even in the optical reading apparatus using a photosensor having a light accumulation time which is so long that it cannot be ignored as compared with a single reading scan time S when the signals are sequentially read from the photo sensor array or the light response leading time $\tau_{on}$, the light source to illuminate an original is divided into a few blocks and these blocks are allowed to sequentially flicker in accordance with the reading scan of the photo sensor array, thereby enabling the driving duty of the LED array to be reduced. Due to this, even in the image reading apparatus using such a photo sensor, it is sufficient to use only a single LED array for illumination of an original and it is possible to reduce the cost of the apparatus and to decrease the operating cost.

Since the number n of divided blocks is suitably determined in consideration of that even if the number of divided blocks of the LED array is uselessly increase, the effect of reduction of the duty is little and, contrarily, this causes the cost of the whole image reading apparatus to be increased. Consequently, there is also an effect that the means for controlling the drive these blocks is made extremely cheap and can be simply constituted.

What we claim is:

1. An image reading apparatus comprising:
a photosensor array of photosensors which are arranged in a direction of width of an original and which receive light derived through a surface of the original and convert information borne by the light into electric signals, in which a period of time from reception of the light by said photosensors until the electric signals are outputted cannot be ignored as compared with a reading scan time when the signals are read from said photosensor array;
a light source arranged in the direction of width of the original and divided into a plurality of blocks; and
light-on control means for lighting said blocks of said light source for reading the original, beginning prior to initiation of reading of the original, for a time interval greater than said period of time from the time when said photosensors receive the light until the electric signals are outputted.

2. An image reading apparatus according to claim 1, wherein said light-on control means turns off said blocks after completion of reading.

3. An image reading apparatus according to claim 1, wherein said blocks of said light source are equal in number to a value which does not exceed a value of 10 multiplied by a quotient of said reading scan time divided by said period of time.

4. An image reading apparatus according to claim 1, wherein said photosensor is a photosensor of a non-accumulation type having a leading time within the period of time from reception of the light by said photosensor until the electric signal is outputted.

5. An image reading apparatus according to claim 1, wherein said photosensor is a photosensor of a signal accumulation type.

* * * * *

UNITED STATES PATENT AND TRADEMARK OFFICE
CERTIFICATE OF CORRECTION

PATENT NO. : 4,791,493
DATED : December 13, 1988
INVENTOR(S) : MAKOTO OGURA, ET AL.

It is certified that error appears in the above-identified patent and that said Letters Patent is hereby corrected as shown below:

ON THE TITLE PAGE
IN [56] REFERENCES CITED

"4114667  7/1983  Japan" should read
--58-114667  7/1983  Japan--.

ON THE TITLE PAGE
IN [57] ABSTRACT

Line 12, "of." should read --of blocks.--.
Line 15, "over neater" should read --greater--.

COLUMN 1

Line 30, "photo sensor" should read --photosensor--.
Line 42, "of" (first occurrence) should read --in--.
Line 64, "photo sensor" should read --photosensor--.
Line 66, "photo sensor" should read --photosensor--.
Line 68, "photo sensor" should read --photosensor--.

COLUMN 2

Line 2, "photo" should read --photo- --.
Line 5, "photo sensor," should read --photosensor--.

UNITED STATES PATENT AND TRADEMARK OFFICE
CERTIFICATE OF CORRECTION

PATENT NO. : 4,791,493

DATED : December 13, 1988

INVENTOR(S) : MAKOTO OGURA, ET AL.                Page 2 of 2

It is certified that error appears in the above-identified patent and that said Letters Patent is hereby corrected as shown below:

COLUMN 4

Line 51, "cause" should read --caused--.
    Line 55, "increase" should read --increased--.

Signed and Sealed this

Twelfth Day of December, 1989

Attest:

JEFFREY M. SAMUELS

*Attesting Officer*    *Acting Commissioner of Patents and Trademarks*